(12) United States Patent
Pal et al.

(10) Patent No.: US 9,152,877 B2
(45) Date of Patent: Oct. 6, 2015

(54) ROUGH WAVELET GRANULAR SPACE AND CLASSIFICATION OF MULTISPECTRAL REMOTE SENSING IMAGE

(75) Inventors: Sankar Kumar Pal, Kolkata (IN); Saroj Kumar Meher, Kolkata (IN)

(73) Assignee: Indian Statistical Institute, Kolkata (IN)

( * ) Notice: Subject to any disclaimer, the term of this patent is extended or adjusted under 35 U.S.C. 154(b) by 435 days.

(21) Appl. No.: 13/265,325

(22) PCT Filed: Jan. 13, 2011

(86) PCT No.: PCT/IB2011/000045
§ 371 (c)(1),
(2), (4) Date: May 22, 2012

(87) PCT Pub. No.: WO2012/069891
PCT Pub. Date: May 31, 2012

(65) Prior Publication Data
US 2012/0183225 A1 Jul. 19, 2012

(30) Foreign Application Priority Data

Nov. 24, 2010 (IN) .......................... 1324/KOL/2010

(51) Int. Cl.
*G06K 9/62* (2006.01)
*G06K 9/66* (2006.01)
*G06K 9/46* (2006.01)
*G06T 7/40* (2006.01)

(52) U.S. Cl.
CPC ............... *G06K 9/4614* (2013.01); *G06T 7/40* (2013.01); *G06T 2207/10036* (2013.01); *G06T 2207/20064* (2013.01); *G06T 2207/30181* (2013.01)

(58) Field of Classification Search
None
See application file for complete search history.

(56) References Cited

U.S. PATENT DOCUMENTS

| 5,377,302 | A | 12/1994 | Tsiang |
| 5,875,108 | A | 2/1999 | Hoffberg et al. |
| 5,901,246 | A | 5/1999 | Hoffberg et al. |
| 6,081,750 | A | 6/2000 | Hoffberg et al. |
| 6,178,261 | B1 | 1/2001 | Williams et al. |
| 6,400,996 | B1 | 6/2002 | Hoffberg et al. |
| 6,418,424 | B1 | 7/2002 | Hoffberg et al. |
| 6,539,122 | B1 | 3/2003 | Abousleman |

(Continued)

FOREIGN PATENT DOCUMENTS

KR 20070115403 A 12/2007

OTHER PUBLICATIONS

Hsu, "Feature extraction of hyperspectral images using wavelet and matching pursuit", ISPRS Journal of Photogrammetry & Remote Sensing, vol. 62, issue 2, Jun. 2007.*

(Continued)

*Primary Examiner* — Soo Park
(74) *Attorney, Agent, or Firm* — Turk IP Law, LLC

(57) ABSTRACT

Shift-invariant wavelet transform with properly selected wavelet base and decomposition level(s), is used to characterize rough-wavelet granules producing wavelet granulation of a feature space for a multispectral image such as a remote sensing image. Through the use of the granulated feature space contextual information in time and/or frequency domains are analyzed individually or in combination. Neighborhood rough sets (NRS) are employed in the selection of a subset of granulated features that further explore the local and/or contextual information from neighbor granules.

19 Claims, 8 Drawing Sheets

(56) References Cited

U.S. PATENT DOCUMENTS

| | | | |
|---|---|---|---|
| 6,640,145 | B2 | 10/2003 | Hoffberg et al. |
| 6,687,657 | B2 | 2/2004 | Levin |
| 6,789,054 | B1 | 9/2004 | Makhlouf et al. |
| 6,850,252 | B1 | 2/2005 | Hoffberg et al. |
| 7,006,881 | B1 | 2/2006 | Hoffberg et al. |
| 7,136,710 | B1 | 11/2006 | Hoffberg et al. |
| 7,277,489 | B1 | 10/2007 | Andrew |
| 7,397,957 | B2 | 7/2008 | Kim et al. |
| 7,451,005 | B2 | 11/2008 | Hoffberg et al. |
| 7,590,589 | B2 | 9/2009 | Hoffberg et al. |
| 2006/0142956 | A1 | 6/2006 | Starzyk et al. |
| 2008/0059027 | A1 | 3/2008 | Farmer et al. |

OTHER PUBLICATIONS

Kingsbury, "Shift invariant properties of the dual-tree wavelet transform", IEEE International Conference on Acoustics, SPeech, and Signal Processing 1999.*

Wang et al., "Subset selection using rough set in wavelet packet based texture classification", ICWAPR 2008.*

Pal et al., "Pattern classification using class-dependent rough-fuzzy granular space", RSKT 2010.*

Ni et al., "Noise analysis and restrain in the fusion process of remote sensing", IEEE International Conference on ICIS 2010, Oct. 2010.*

Zhang et al., "A method of tumor classification based on wavelet packet transforms and neighborhood rough set", Computers in Biology and Medicine, vol. 40, issue 4, Apr. 2010.*

Cao et al., "The application of run-length features in remote sensing classification combined with neural network and rough set", IEEE International Conference on GRC 2007.*

Freitas et al., "Combining wavelets and linear spectral mixture model for MODIS satellite sensor time-series analysis", Journal of Computational Interdisciplinary Sciences (2008) 1(1) 51-56.*

Shen et al., "Selecting informative features with fuzzy-rough sets and its application for complex systems monitoring", Pattern Recognition 37 (2004) 1351-1363.*

Zadeh, "Some Reflections on Soft Computing, Granular Computing and Their Roles in the Conception, Design and Utilization of Information/Intelligent Systems," Soft Computing, (1998) vol. 2, pp. 23-25.

Pedrycz et al., "The Design of Granular Classifiers: A Study in the Synergy of Interval Calculus and Fuzzy Sets in Pattern Recognition," Pattern Recognition (2008) vol. 41, pp. 3720-3735.

Pal et al., "Multispectral Image Segmentation Using Rough Set Initialized EM Algorithm," IEEE Trans. Geoscience and Remote Sensing, vol. 40, pp. 2495-2501, 2002.

Zadeh, Fuzzy Sets and Information Granularity in Advances in Fuzzy Set Theory and Applications, M. Gupta, R. Ragade and R. Yager (Eds.), North-Holland Publishing Co., Amsterdam, pp. 3-18, 1979.

Pawlak, "Rough Sets," International Journal of Computer and Information Science, vol. 11, pp. 341-356, 1982.

Peters et al., "A Rough Set Approach to Measuring Information Granules," in Proc. of Annual International Conf. on Computer Software and Applications, pp. 1355-1360, 2002.

Huang et al., "A rough Set-Based Svm Classifier for atr on the Basis of Invariant Moment," in Proc. of WRI Int. Conf. on Communications and Mobile Computing, pp. 620-625, 2009.

Mushrif et al., "Color Image Segmentation: Rough-Set Theoretic Approach," Pattern Recognition Lett., vol. 29, pp. 483-493, 2008.

Wang et al., "Multispectral Remote Sensing Image Classification Algorithm Based on Rough Set Theory," in Proc. of IEEE Int. Conf. on Syst., Man Cybern., pp. 4853-4857, 2009.

Haralick et al., "Combined spectral and spatial processing of ERTS imagery data," Remote Sensing of Environment, vol. 3, pp. 3-13, 1974.

Lin, Granulation and nearest neighborhoods: rough set approach. in: W. Pedrycz (Eds.), Granular computing: an emerging paradigm, Physica-Verlag, Heidelberg, Germany, pp. 125-142, 2001.

Hu et al., "Neighborhood rough set based heterogeneous feature subset selection," Inf. Sciences, vol. 178, pp. 3577-3594, 2008.

Pal et al., "Segmentation of remotely sensed images with fuzzy thresholding, and quatitative evaluation," Int. J. of Remote Sensing, vol. 21, pp. 2269-2300, 2000.

Davies et al., "A Cluster Separation Measure," IEEE Trans. Pattern Anal. Machine Intell., vol. 1, pp. 224-227, 1979.

Antonini et al., "Image Coding Using Wavelet Transform," IEEE Trans. Image Processing, vol. 1, pp. 205-220, 1992.

Thangavel et al., "Dimensionality Reduction Based on Rough Set Theory: A review," Applied Soft Computing, vol. 9, pp. 1-12, 2009.

Chouchoulas et al., "Rough Set-Aided Keyword Reduction for Text Categorisation," Applied Artificial Intelligence, vol. 15, pp. 843-873, 2001.

Own et al., "Rough Wavelet Hybrid Image Classification Scheme", Journal of Convergence Information Technology vol. 3, No. 4 (Dec. 2008) pp. 65-75.

Zhai et al., Rough-Neural Image Classification Using Wavelet Transform, Proceedings of the Sixth International Conference on Machine Learning and Cybernetics, Hong Kong (Aug. 2007) pp. 19-22.

Fdez-Sarria, A, Ruiz, L.A., Recio, JA, Study of methods based on wavelets for texture classification high resolution images. 25th EARSeL Symposium. Global Developments in Environmental Earth Observation from Space, Porto, Portugal, Jun. 6-11, 2005, pp. 19-25.

Fdez-Sarria, A, Ruiz, L.A., Recio, J.A., Texture feature extraction for classification of remote sensing data using wavelet decomposition: A comparative study. 20$^{th}$ International Society on Photogrammetry and Remote Sensing Congress, 2004. vol. 35, pp. 1109-1114.

International Search Report and Written Opinion for PCT/IB2011/000045 mailed Jun. 7, 2011.

Pal, S. K., "Computational Theory Perception (CTP), Rough-Fuzzy Uncertainty Analysis and Mining in Bioinformatics and Web Intelligence: A Unified Framework," Lecture Notes in Computer Science, vol. 5946, pp. 106-129 (2010).

Skowron, A., and Peters, J. F., "Rough-Granular Computing," Handbook of Granular Computing, Chapter 13, pp. 285-327 (Jul. 16, 2008).

* cited by examiner

ROUGH WAVELET GRANULAR SPACE AND CLASSIFICATION OF MULTISPECTRAL REMOTE SENSING IMAGE

CROSS-REFERENCE TO RELATED APPLICATIONS

This Application is the National Stage filing under 35 U.S.C §371 of PCT Application Ser. No. PCT/IB2011/000045 filed on Jan. 13, 2011, which claims priority under 35 U.S.C. §119(a) of India Application No. 1324/KOL/2010 filed on Nov. 24, 2010.

BACKGROUND

Unless otherwise indicated herein, the materials described in this section are not prior art to the claims in this application and are not admitted to be prior art by inclusion in this section.

Granular computing refers to computation and operations performed on information granules (group of similar objects or points). Its applicability covers conceptual and computational paradigms of studying information and knowledge processing. Information granules may be constructed specifically in spatial domain and applied to various areas, including automatic target recognition, color image segmentation, and remote sensing image classification. Multispectral remote sensing images may contain information over a large range of variation of frequencies, which may also change over regions. Such data have both spectral features with correlated bands and spatial features correlated in the same band. Simultaneous utilization of the spectral and spatial (contextual) information in an effective manner may enhance the analysis. Methods utilizing the merits of local information in a band for the classification of images, for example, texture features extracted from angular second moments, contrast, correlation, entropy and variance based on the grey-level co-occurrence matrices have found wide applications. However, these methods are typically computationally expensive.

Wavelet transform (WT) is employed as a tool for analyzing texture regions of images, in both spatial (time) and spectral (frequency) domains. Thus, WT may be used for extraction of contextual information of pixels in images by wavelet granulation (i.e., group of similar information in WT domain) of a feature space. Although shift variant WT is quite attractive for various applications, it does not maintain the indispensable property of textural analysis, like time invariance, and makes it insufficient for dealing with texture analysis. Furthermore, the redundant representation of input using WT may increase the feature dimension and bring additional complexity in solving tasks associated with pattern recognition, machine learning and data mining.

Rough set theory has been shown to be an effective tool for feature selection, uncertainty handling, knowledge discovery, and rule extraction from categorical data. The theory enables the discovery of data dependencies and performs the reduction/selection of attributes contained in a data set using the data alone, requiring no additional information. While rough sets may be used as an effective tool to deal with both vagueness and uncertainty in data sets and to perform granular computation, they may be used for numerical data with the discretization of the data, which may result in the loss of information and introduction of noise.

SUMMARY

The present disclosure describes a method for performing rough-wavelet based analysis of spatio-temporal patterns. The method includes generating a wavelet granulated space of features associated with a multispectral image, selecting features based on a rough set evaluation, removing redundant features, and/or classifying patterns based on selected features.

The present disclosure further provides an apparatus for performing rough-wavelet based analysis of spatio-temporal patterns. The apparatus may include a memory configured to store instructions and data associated with an input pattern vector of a multispectral image and a processor coupled to the memory, where the processor is adapted to generate a wavelet granulated space of features associated with the multispectral image, select features based on a rough set evaluation, remove redundant features, and/or classify patterns based on selected features.

The present disclosure also describes a computer-readable storage medium with instructions stored thereon for performing rough-wavelet based analysis of spatio-temporal patterns. The instructions may include generating a wavelet granulated space of features associated with a multispectral image, selecting features based on a rough set evaluation, removing redundant features, and/or classifying patterns based on selected features, where spectral band values may be used as features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
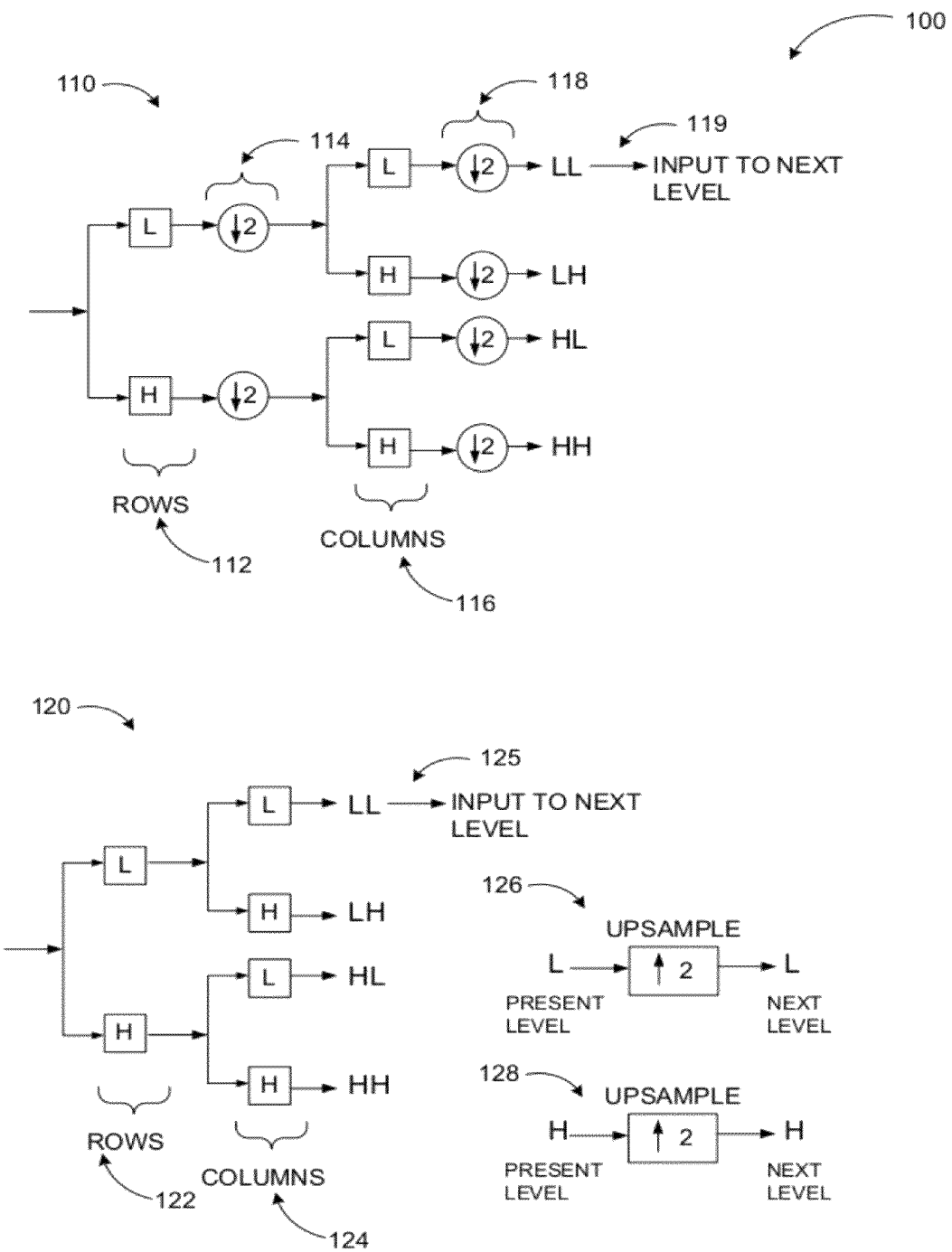
FIG. 1 illustrates example flows for two-dimensional shift-variant and shift-invariant discrete wavelet transforms for one-level decomposition.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to analysis of multispectral images using rough-wavelet granular space.

Briefly stated, shift-invariant wavelet transform with properly selected wavelet base and decomposition level(s) may be used to characterize rough-wavelet granules producing wavelet granulation of a feature space for a multispectral image such as a remote sensing image. Through the use of the granulated feature space contextual information in time and/or frequency domains may be analyzed individually or in combination. Neighborhood rough sets (NRS) may be employed in the selection of a subset of granulated features that further explore the local and/or contextual information from neighbor granules.

FIG. 1 illustrates example flows for two-dimensional shift-variant and shift-invariant discrete wavelet transforms for one-level decomposition arranged in accordance with at least some embodiments described herein. Image classification in digital image processing categorizes images into different groups based on one or more predefined classification criteria. Image classification may be performed in two stages: image feature extraction from a source image and construction of an image classifier.

Feature extraction methods may be grouped under three major categories: statistics-based methods, model-based methods, and filter-based methods. Statistics-based methods use image statistical features, such as color histograms, to represent an image. Model-based methods employ a probability distribution model to describe the source image, such as Markov chains and/or Markov random fields. Filter-based methods may employ a bank of filters to transform the source image into frequency or time domain from spatial domain, where the image features are defined using transformed coefficients. Wavelet filters may be used to decompose a source image into different sub-bands, where the image features are characterized by the wavelet coefficients.

According to some embodiments a rough-wavelet granular space based model may be used for land cover classification of multispectral remote sensing images or other images, where shift-invariant granules are formulated in the wavelet domain. The shift-invariant wavelet transform with properly selected wavelet base and decomposition level(s), may be used to characterize rough-wavelet granules producing wavelet granulation of the feature space for the multispectral image. Furthermore, NRS may be employed to select a subset of granulated features for further examining local and/or contextual information from neighbor granules.

Thus, a model according to some embodiments exploits shift-invariant wavelet granulation and NRS mutually, which may enhance an efficiency and accuracy of the computation especially in the pattern classification with overlapping classes.

The wavelet transform (WT) is primarily developed for the analysis of non-stationary signals. The transform operates on a dual plane instead of working on a single plane (time or frequency). The transform performs the decomposition of signal into a number of scales, where each scale represents a particular coarseness of that signal. The discrete WT (DWT) has become largely popular because of its computationally efficient implementation using the Mallat algorithm in computation and in practical implementation through banks of filters and gates. Broadly, the DWT may be categorized as shift/time/translation-variant (non-redundant) and shift-invariant (redundant). Two-dimensional (2D) shift-variant DWT (SV-DWT) (extension of one-dimensional SV-DWT) may be implemented as a separable filter bank 110 in row (112) and column (116) directions, which performs one-level decomposition of an image into four sub-images in four equal sub-bands, as shown in Diagram 100.

H and L in filter bank 110 denote the high-pass and low-pass filters, respectively. ↓2 (114 and 118) components represent the down sampling operation by a factor of 2 (decimation). Approximate image LL (119) is the low-frequency component obtained by low-pass filtering of the input in both row (112) and column (116) directions. The detail images LH, HL, and HH are the high-frequency components including horizontal, vertical and diagonal information, respectively. For more levels of DWT decomposition, the lower frequency component (LL) may be recursively processed. With this process, the SV-DWT with Q-level of decomposition may generate a total of 3Q+1 sub-bands.

Filter bank 120 is an example of shift-invariant DWT (SI-DWT), where down-sampling is not performed in row (122) and column (124) filter stages. Instead, an input to the next level (125) is subjected to up-sampling through low-pass and high-pass paths (126 and 128).

Figure 2:
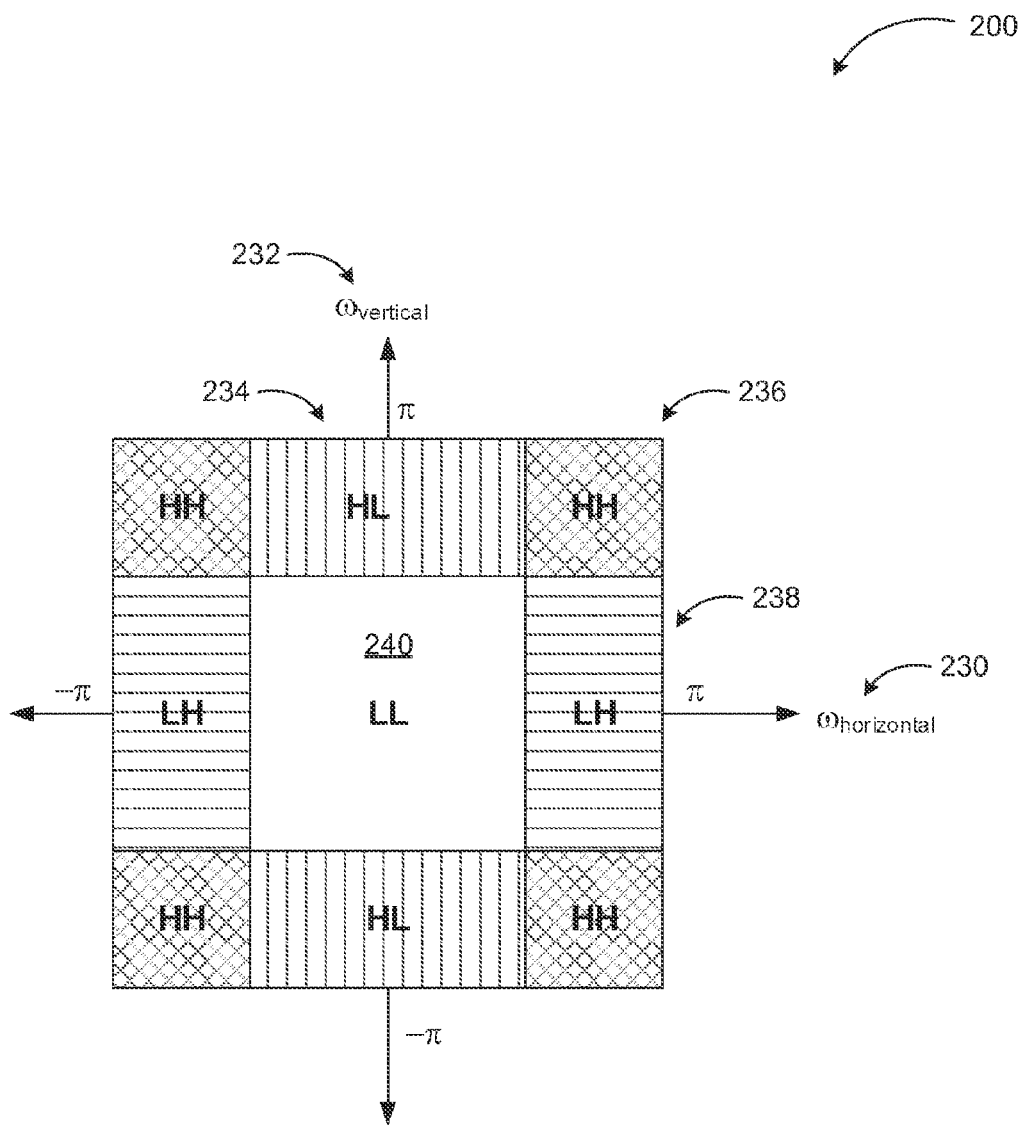
FIG. 2 illustrates an example for two-dimensional wavelet transform and its spectral subspaces for one-level decomposition.

FIG. 2 illustrates an example for two-dimensional wavelet transform and its spectral subspaces for one-level decomposition in accordance with at least some embodiments described herein. SV-DWT can support compression without substantial loss or redundancy of information between the levels. However, time may vary in SV-DWT (i.e., the coefficients of a delayed information are not a time-shifted version of those of the original), which may result in degradation of performance in texture analysis such as land cover regions in remote sensing images.

Shift-invariant DWT (SI-DWT), on the other hand, performs the decomposition without a down-sampling operation, and the filter coefficients (L and H) are up-sampled (↑2) by a factor of 2 for use at a next level of decomposition, as discussed above. As a result, the SI-DWT may provide a shift-invariant representation of the input. Similar to 2D SV-DWT, 2D SI-DWT decomposes the original frequency band into four equal sub-bands with one-level of decomposition (LL 240, LH 238, HL 234, and HH 236). Diagram 200 illustrates a corresponding frequency partition with the horizontal axis showing $\omega_{horizontal}$ 230 and the vertical axis showing $\omega_{vertical}$ 232. The sizes of the sub-images obtained by SV-DWT may decrease with the increase of decomposition levels, whereas their sizes may remain the same as the original using SI-DWT.

Figure 3:
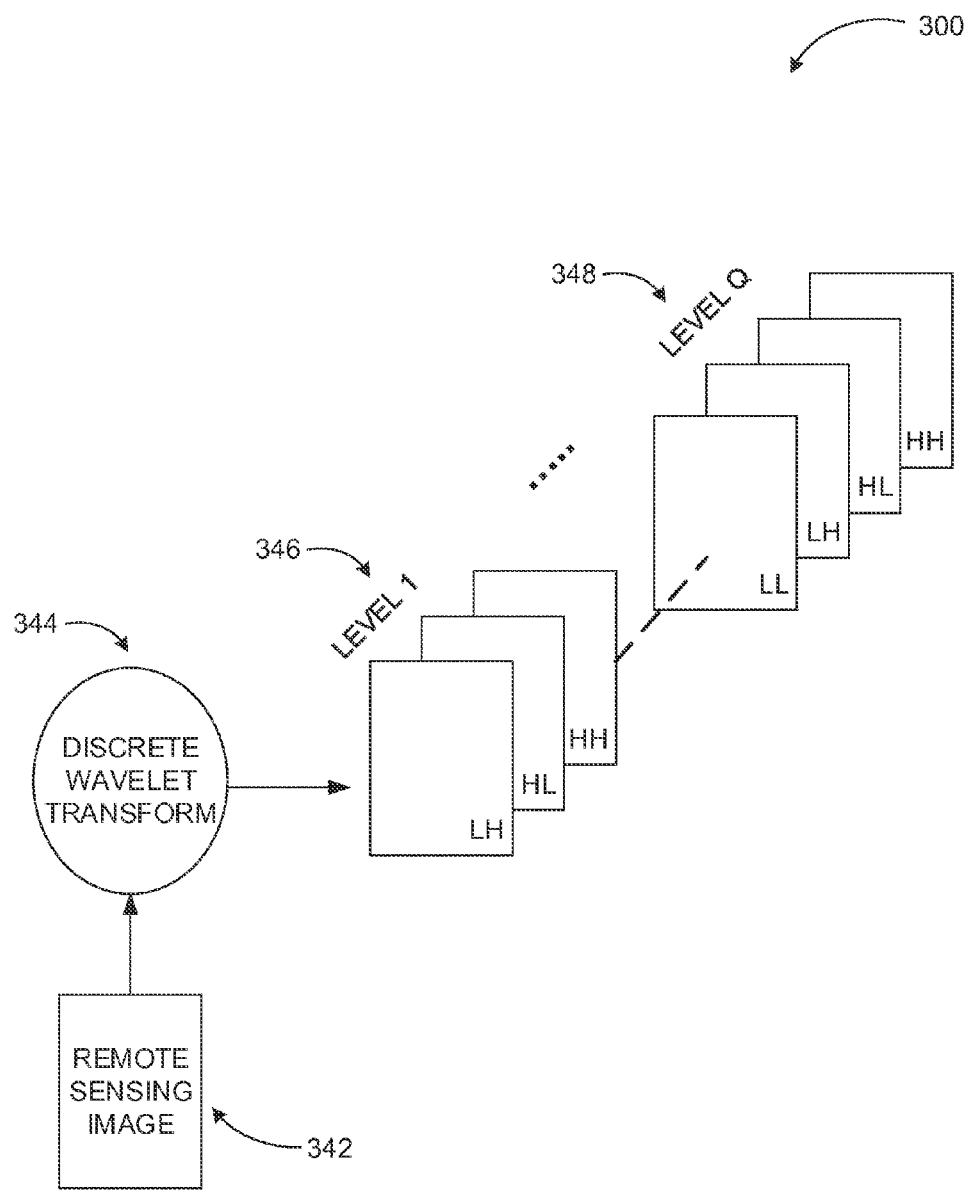
FIG. 3 illustrates feature elements generation with one spectral band of image using WT decomposition.

FIG. 3 illustrates feature elements generation with one spectral band of image using WT decomposition in accordance with at least some embodiments described herein.

In some example implementations, spectral (band) values may be used as features for a multispectral remote sensing image 342. DWT decomposition 344 of image 342 may be performed up to the desired levels (level 1 through Q) and corresponding sub-images 346, 348 may be obtained. Since the pixels of the sub-images at different levels represent the information of the original pixels, these pixel values may be employed to construct the pattern vector. The sub-images may then be cascaded so that the extracted features of the original multispectral image can be obtained. Diagram 300 shows cascading of sub-images 346, 348 of a single band image obtained by Q-level of DWT decomposition. The cascading process may be extended for the sub-images of multi-band images.

Figure 4:
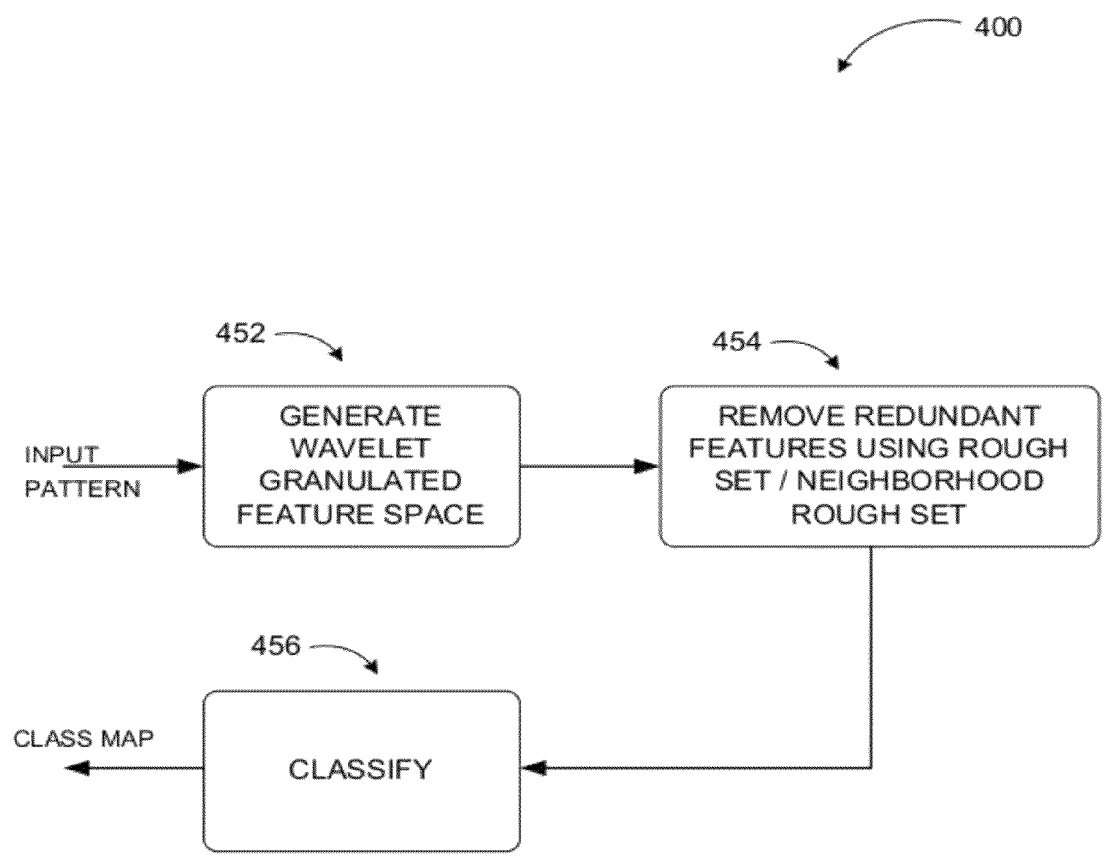
FIG. 4 illustrates an example schematic flow diagram of a classification process combining shift-invariant wavelet transform and neighborhood rough set based feature selection.

FIG. 4 illustrates an example schematic flow diagram of a classification process combining shift-invariant wavelet transform and neighborhood rough set based feature selection in accordance with at least some embodiments described herein. As illustrated summarily in diagram 400, image classification according to some embodiments may be performed in three stages: generation of wavelet granulated feature space from an input pattern (452), removal of redundant features using rough set or neighborhood rough set (454), and classification based on the selected features (456).

According to some embodiments, SI-DWT may be employed to characterize the feature values in wavelet granulation of the input pattern vector of a multispectral remote sensing image. The SI-DWT identifies both scale and space information of the event simultaneously to build a granular space enhancing the classification for data sets with overlapping classes. Based on the number of decomposition level(s), each of the input feature spaces may be represented by the corresponding number of equal areas frequency planes, thus, producing wavelet granules in a time-frequency plane. As a whole, the granulated feature space may constitute $4^n$ and $7^n$ granules in n-dimension feature space for one and two levels of DWT decomposition, respectively.

The decomposition level depends on the type of requirement and varies with the image processing in hand. Average entropy may be computed providing a measure of information of the image for each level. The average entropy value may not change substantially after a certain level of decomposition. Thus, the decomposition may be stopped after a few levels, for example, after the second level. After that level, the cost of computation may continue to increase, while no substantial new information may be gained. Various distinguishable characteristics like spatio-geometric information and energy at different scales, which are normally called the signature of the land covers in remote-sensing images, may be preserved with the DWT decomposition using orthogonal basis and further enhanced using bi-orthogonal bases. Hence, a bi-orthogonal group of wavelet bases may be employed in an image processing system according to some embodiments.

The bi-orthogonal bases may be more desirable than orthogonal ones because they can maintain linear phase characteristic with finite number of impulse responses and the wavelets have high regularity. In the wavelet granulation process, each feature value may be represented by 7 sub-bands characterizing 7 wavelet granules along the axis and result in the increase of feature dimension. The increased dimension may increase a complexity of some of the tasks of pattern recognition, as in land cover classification of remote sensing image. Thus, a subset of relevant and non-redundant features may be selected. According to other embodiments, a neighborhood rough set (NRS) based feature selection method may be employed in the second operation of the process. NRS can deal with both numerical and categorical data and does not require any discretization of numerical data. Moreover, the neighboring sets facilitate gathering of possible local information through neighbor granules that provide enhanced class discrimination information. Thus, by taking advantage of the combination of shift-invariant wavelet granulation and NRS feature selection methods, an enhanced framework may be provided for the classification of patterns in overlapping class environment.

Rough sets create approximate descriptions of objects for data analysis. In computing rough sets, lower and upper approximations may be determined. The lower approximation is a description of the domain objects, which are known with certainty to belong to the subset of interest, and the upper approximation is a description of the objects, which possibly as well as definitely belong to the subset. Rough sets may be employed to remove redundant conditional features, while retaining their information content and enabling discovery of data dependencies and selection of feature subsets contained in a data set using the data alone without additional information. According to some examples, rough sets may partition the object space based on a feature set using an equivalence relation. The partition spaces thus generated are also known as granules. The generated granules may become the elemental building blocks for information granulation process used for data analysis. A measure of significance may then be determined by evaluating the change in dependency when a feature is removed from the set. The higher the change in dependency, the more significant a particular feature may be. Based on this significance a minimum element feature subset may be searched and located.

For efficiency of computing and resource management, a quickreduct algorithm may be employed for large data sets. A quickreduct algorithm calculates a minimum element feature set without exhaustively generating all possible subsets. The reduction of attributes may be achieved by comparing equivalence relations generated by sets of attributes. Attributes may be removed so that the reduced set provides the same predictive capability of the decision feature as the original. A reduct may be defined as a subset of minimal cardinality Rmin of the conditional attribute set C such that $\gamma R(D)=\gamma C(D)$. Additionally, an element of pruning may be introduced in a quickreduct algorithm. By noting the cardinality of any pre-discovered reducts, the current possible subset may be ignored if it contains more elements. The selected features may then be used for the classification process.

Based on the significance of a feature(s), the subset of features (reduct) may be evaluated using neighborhood rough set theory according to further embodiments. One or more suitable sets of reducts may be obtained based on the significance. A forward greed search algorithm may be employed for feature selection using neighborhood rough set.

After the features are selected, a classifier may be used to classify the input pattern based on the selected features. According to some embodiments, a threshold value for various distances used in NRS, beyond which classification performance falls substantially, may also be determined. Inclusion of rough set theoretic feature selection method may not only increase the performance of the image processing system, but also reduce a computational time needed for wavelet based classification. In addition to multispectral remote sensing image classification, the model described herein may be used for the analysis of other spatio-temporal patterns such as texture analysis for Augmented Reality (AR) applications.

A comparative analysis with total computational time (obtained from the sum of the training and testing times) for a k-nearest neighbor classifier (k-NN with k=1), a wavelet granulation and a k-NN classifier (with k=1), a wavelet granulation with rough set based feature selection and a k-NN classifier (with k=1), and a wavelet granulation with NRS based feature selection and a k-NN classifier (with k=1), illustrates that the total computation time values for wavelet-granulation based model is higher with reduced accuracy, compared to rough-wavelet granulation and feature selection based models.

A percentage of gain of the four models discussed above also shows that the wavelet granulation with NRS based feature selection and a k-NN classifier (with k=1) provides additional accuracy. Embodiments are not limited to wavelet granulation with NRS based feature selection and a k-NN classifier (with k=1). Other classifiers such as k-NN (k=3), k-NN (k=5), maximum likelihood (ML) classifier, or multi-layered perceptron (MLP) may also be employed in the third operation of the process. The comparatively high efficiency and accuracy of the model using wavelet granulation with NRS based feature selection and a classifier over other models mentioned above can also be illustrated experimentally.

Figure 5:
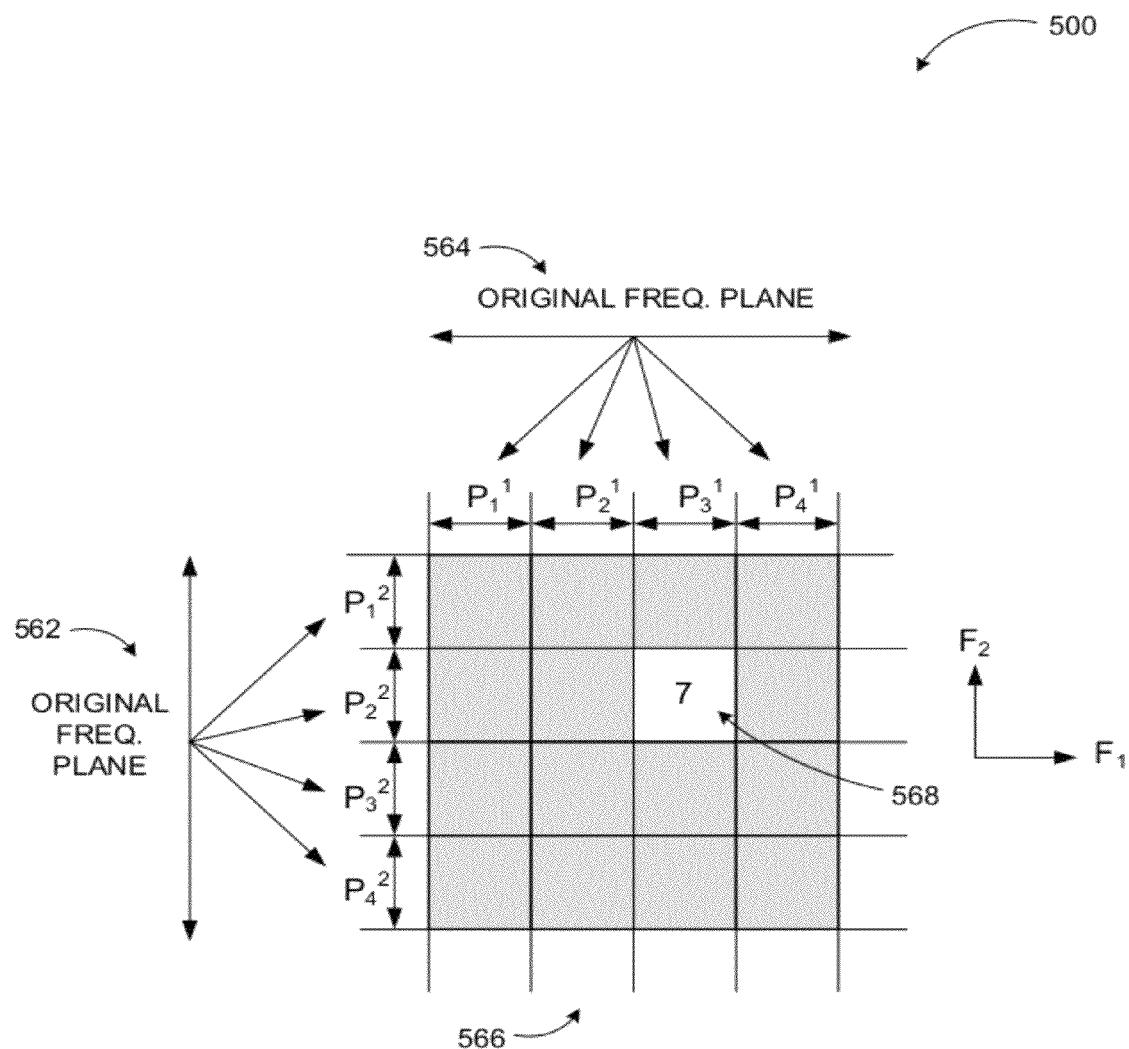
FIG. 5 illustrates an example of feature elements generation with one spectral band of image using wavelet transform decomposition.

FIG. 5 illustrates an example of feature elements generation with one spectral band of image using wavelet transform decomposition in accordance with at least some embodiments described herein. Diagram 500 displays a pictorial view of generated wavelet granules for one-level DWT decomposition in two-dimensional (F1 and F2) feature space 566. Granule number 7 (568), for example, is characterized by frequency planes $P^1_3$ and $P^2_2$ of the original frequency planes 564 and 562, respectively. As a whole, the granulated feature space constitutes $4^n$ and $7^n$ granules in n-dimension feature space for one and two levels of DWT decomposition, respectively.

Based on the number of decomposition level(s), each of the input feature spaces may be represented by a corresponding number of equal areas frequency planes (e.g., 562, 564), thereby producing wavelet granules in time-frequency plane.

Figure 6:
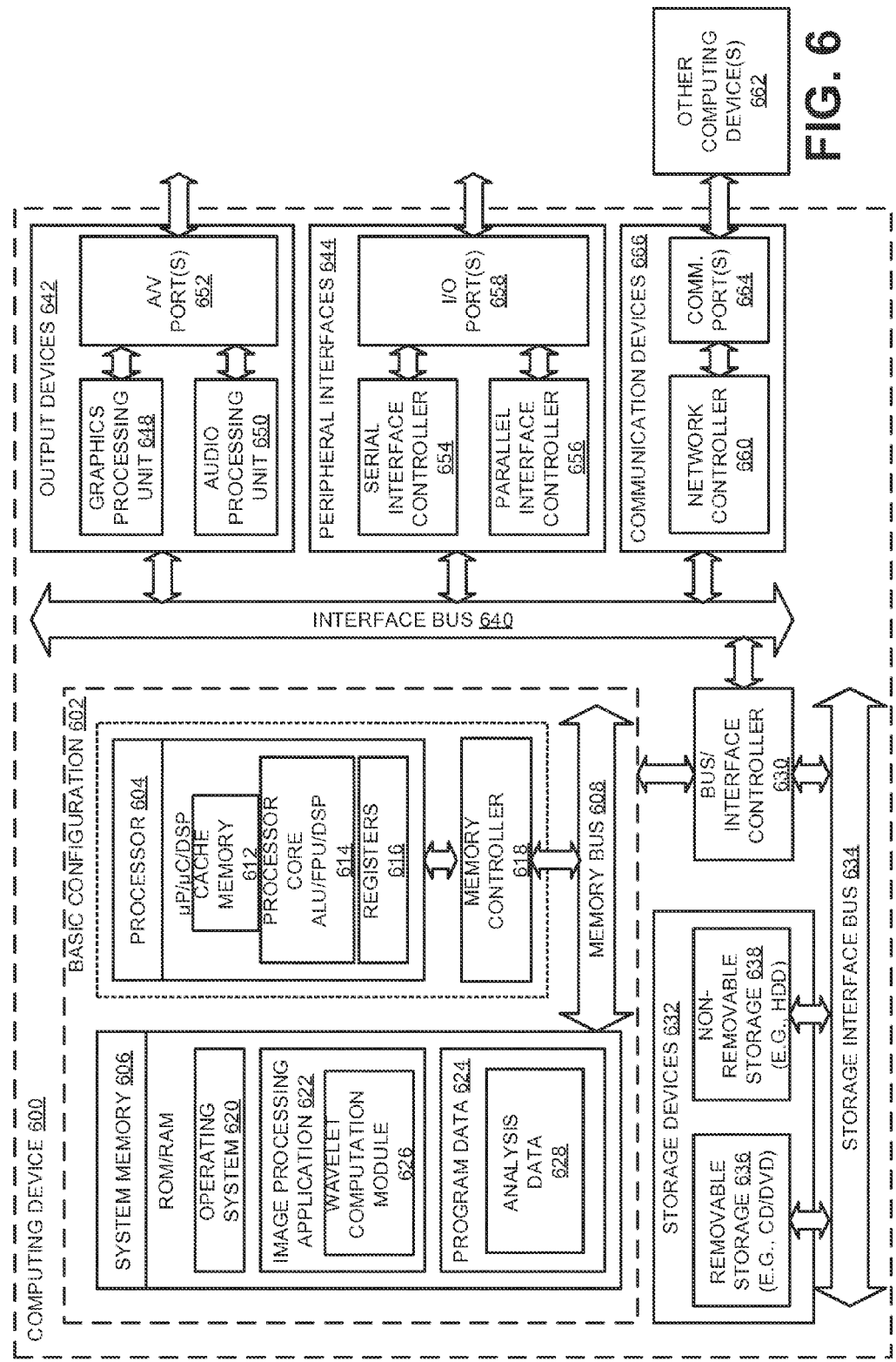
FIG. 6 illustrates a general purpose computing device, which may be used to implement classification process combining shift-invariant wavelet transform and neighborhood rough set based feature selection.

FIG. 6 illustrates a general purpose computing device, which may be used to implement classification process combining shift-invariant wavelet transform and neighborhood rough set based feature selection in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level cache memory 612, a processor core 614, and registers 616. Example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a wavelet computation module 626 that is arranged to perform rough-wavelet based analysis of spatio-temporal patterns by generating a wavelet granulated space, selecting features based on a rough set evaluation, removing redundant features, and classifying the patterns based on the selected features and any other processes, methods and functions as discussed above. Program data 624 may include one or more of analysis data 628 (e.g., image data, etc.) and similar data as discussed above in conjunction with at least FIG. 1 through 5. This data may be useful for processing remote sensing and similar images as is described herein. In some embodiments, application 622 may be arranged to operate with program data 624 on operating system 620 such that switch traffic is scheduled as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 666) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 666 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a physical server, virtual server, a computing cloud, or a hybrid device that include any of the above functions. Computing device 600 may also be implemented as a personal computer including both laptop computer and non-laptop computer configurations. Moreover computing device 600 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
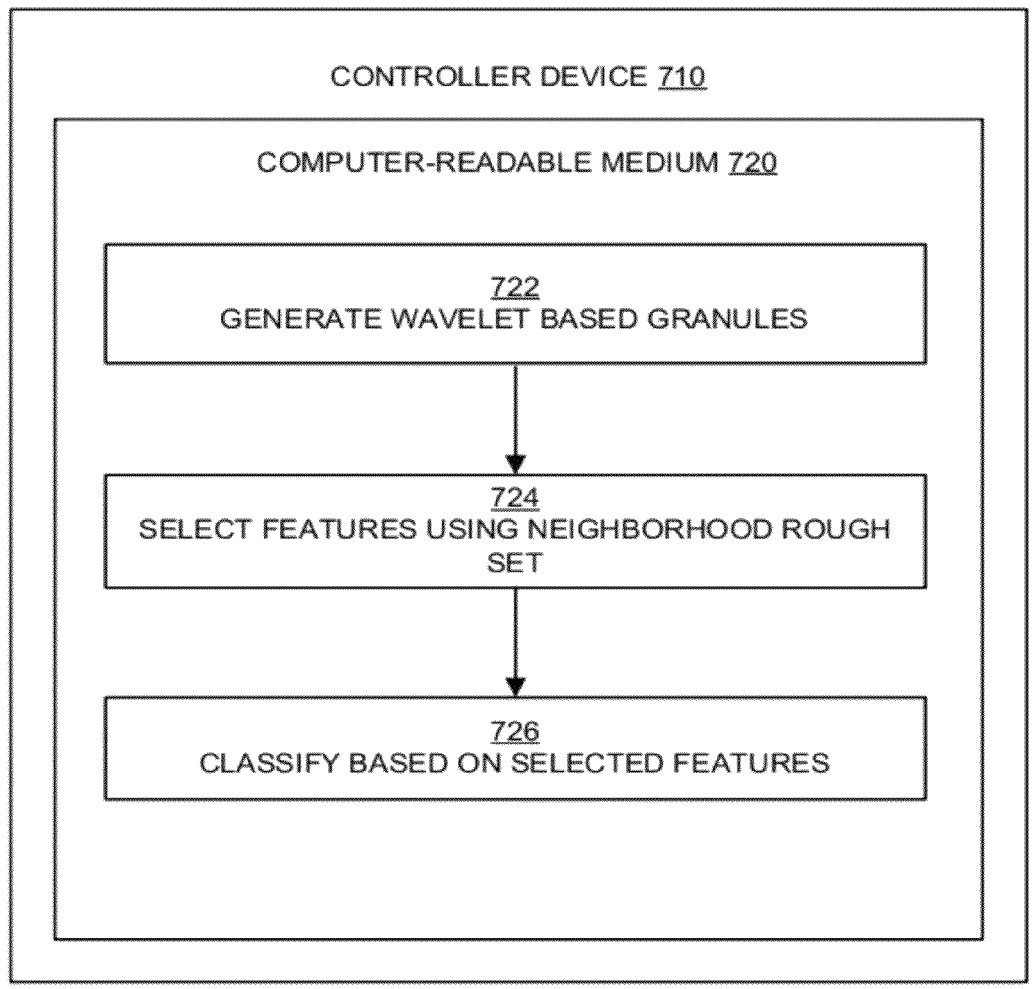
FIG. 7 is a flow diagram illustrating an example method for rough-wavelet granular space based classification of multispectral images that may be performed by a computing device such as device 600 in FIG. 6.

FIG. 7 is a flow diagram illustrating an example method for rough-wavelet granular space based classification of multispectral images that may be performed by a controller device 710 in accordance with at least some embodiments described herein. The controller device 710 may be, for example, computing device 600 in FIG. 6. The operations described in blocks 722 through 726 may be stored as computer-executable instructions in a computer-readable medium 720 such as the drives 640 of the computing device 600.

A process of rough-wavelet granular space based classification of multispectral images may begin with operation 722, "GENERATE WAVELET BASED GRANULES." At operation 722, an input pattern vector of a multispectral image may be transformed through SI-DWT using shift-invariant granules in wavelet domain. Based on a number of implemented decomposition level(s), each of the input feature spaces may be represented by the corresponding number of equal areas frequency planes producing wavelet granules in time-frequency plane.

Operation 722 may be followed by operation 724, "SELECT FEATURES USING NEIGHBORHOOD ROUGH SET." At operation 724, rough set theory and a quickreduct algorithm may be employed to select features. Because a number of feature sets may be found that satisfy the criteria, NRS may be employed in the selection of a subset of granulated features that further explore the local/contextual information from neighbor granules.

At operation 726 "CLASSIFY BASED ON SELECTED FEATURES" following operation 724, a classifier may be used to categorize the input pattern based on the features selected at operation 724. The classifier may include a k-NN classifier (with k=1, 3, or 5), a maximum likelihood (ML) classifier, a multi-layered perceptron (MLP), or similar classifiers.

The operations included in the above described process are for illustration purposes. Rough-wavelet granular space based classification of multispectral images may be implemented by similar processes with fewer or additional operations. In some examples, the operations may be performed in a different order. In some other examples, various operations may be eliminated. In still other examples, various operations may be divided into additional operations, or combined together into fewer operations.

Figure 8:
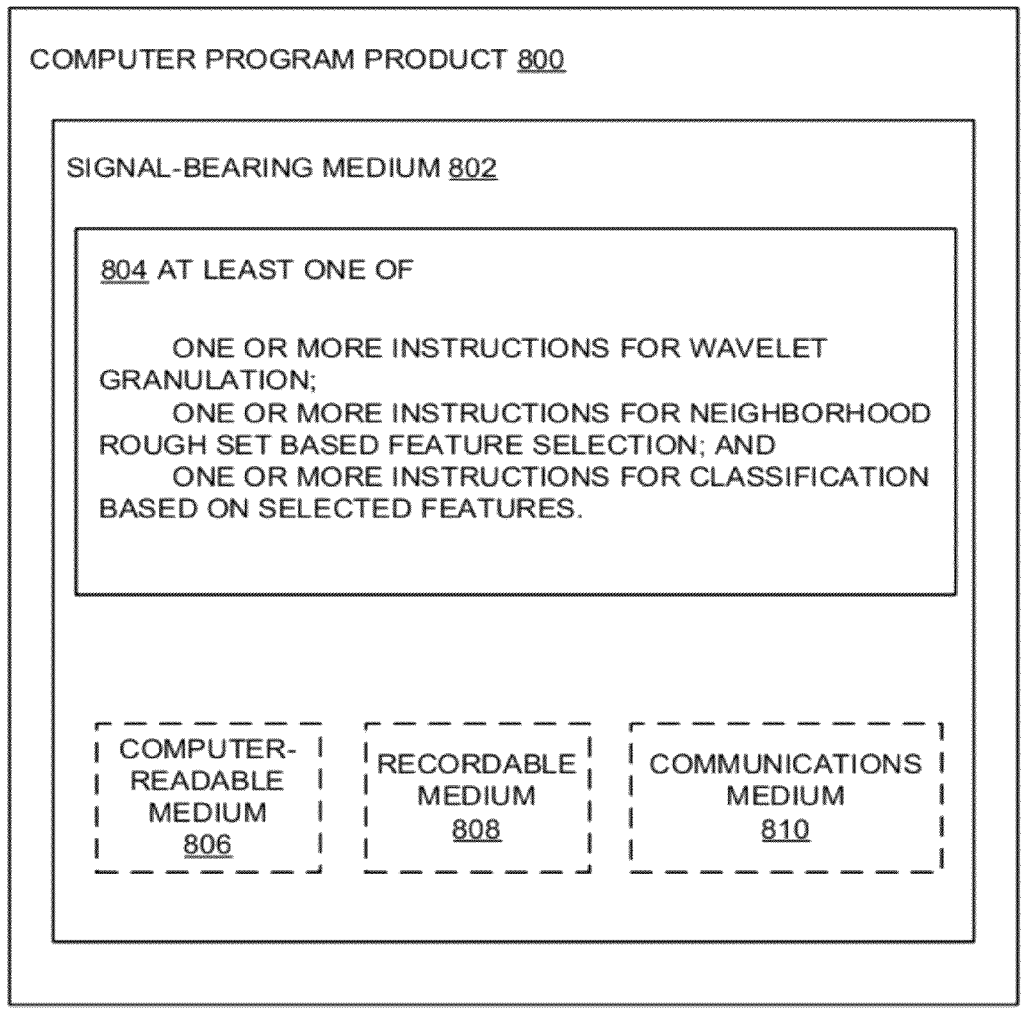
FIG. 8 illustrates a block diagram of an example computer program product; all arranged in accordance with at least some embodiments described herein.

FIG. 8 illustrates a block diagram of an example computer program product arranged in accordance with at least some embodiments described herein. In some examples, as shown in FIG. 8, computer program product 800 may include a signal bearing medium 802 that may also include machine readable instructions 804 that, when executed by, for example, a processor, may provide the functionality described above with respect to FIG. 6. Thus, for example, referring to the computing device 600, the scheduling module 626 may undertake one or more of the tasks shown in FIG. 8 in response to instructions 804 conveyed to the processor 604 by the medium 802 to perform actions associated with differential frame based scheduling for input queued switches as described herein. Some of those instructions may be associated with wavelet granulation, neighborhood rough set based feature selection, and classification based on selected features.

In some implementations, the signal bearing medium 802 depicted in FIG. 8 may encompass a computer-readable medium 806, such as, but not limited to, a hard disk drive, a Compact Disc (CD), a Digital Versatile Disk (DVD), a digital tape, memory, etc. In some implementations, signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of the processor 604 by an RF signal bearing medium, where the signal bearing medium 802 is conveyed by a wireless communications medium 810 (e.g., a wireless communications medium conforming with the IEEE 802.11 standard).

The present disclosure presents a method for performing rough-wavelet based analysis of spatio-temporal patterns. The method includes generating a wavelet granulated space of features associated with a multispectral image, selecting features based on a rough set evaluation, removing redundant features, and/or classifying patterns based on selected features.

According to some examples, the method may also include using spectral band values as features or generating the wavelet granulated space by formulating shift-invariant granules in wavelet domain. Moreover, the method may further include formulating the shift-invariant granules through a shift-invariant discrete wavelet transform (SI-DWT) that characterizes feature values for wavelet granulation of an input pattern vector of the multispectral image. The SI-DWT may be stopped after a second decomposition.

According to other examples, the wavelet granulated space may constitute $4^n$ granules in an n-dimension feature space for a one-level DWT decomposition or $7^n$ granules in an n-dimension feature space for a two-level DWT decomposition. The method may also include selecting wavelet bases and decomposition levels to characterize granules for producing wavelet granulation of a feature space. Bi-orthogonal wavelet bases may be employed and the features selected based on rough set evaluation comprises employing neighborhood rough sets (NRS) in the selection of a subset of granulated features that further explore local and/or contextual information from neighbor granules.

According to further examples, the subset of granulated features may be evaluated based on a significance of the features. A forward greed search algorithm may be employed for the feature selection. Moreover, the patterns may be classified based on the selected features by determining a threshold for distances used in NRS, beyond which classification performance falls substantially. Furthermore, a k-nearest neighbors classifier, a maximum likelihood classifier, or a multilayered perceptron classifier may be used to classify the patterns based on the selected features. In case of k-nearest neighbors classifier, the k-value may be 1, 3, or 5. Also, the multispectral image may be a remote sensing image.

The present disclosure also presents an apparatus for performing rough-wavelet based analysis of spatio-temporal patterns. The apparatus may include a memory configured to store instructions and data associated with an input pattern vector of a multispectral image and a processor coupled to the memory, where the processor is adapted to generate a wavelet granulated space of features associated with the multispectral image, select features based on a rough set evaluation, remove redundant features, and/or classify patterns based on selected features.

According to some examples, the rough-wavelet based analysis may be performed to generate a model for land cover classification of a multispectral remote sensing image. The rough-wavelet based analysis may also be performed for one of texture detection or image indexing. The wavelet granulated space may be generated by formulating shift-invariant granules in wavelet domain. Furthermore, the shift-invariant granules may be formulated through a shift-invariant discrete wavelet transform (SI-DWT) that characterizes feature values for wavelet granulation of an input pattern vector of a multispectral image. The processor may also stop the SI-DWT after a second decomposition. As with the method, the wavelet granulated space may constitute $4^n$ granules in an n-dimension feature space for a one-level DWT decomposition or $7^n$ granules in an n-dimension feature space for a two-level DWT decomposition.

According to other examples, the processor may select wavelet bases and decomposition levels to characterize wavelet bases and decomposition levels to characterize granules for producing wavelet granulation of a feature space and employ bi-orthogonal wavelet bases. The processor may also employ neighborhood rough sets (NRS) in the selection of a subset of granulated features that further explore local and/or contextual information from neighbor granules. The processor may evaluate the subset of granulated features based on a significance of the features and use spectral band values as features.

According to further examples, the processor may employ a forward greed search algorithm for the feature selection and determine a threshold for distances used in NRS, beyond which classification performance falls substantially. The processor may employ a k-nearest neighbors classifier, a maximum likelihood classifier, or a multilayered perceptron classifier to classify the patterns based on the selected features, where k may a value of 1, 3, or 5, in case of k-nearest neighbors classifier.

The present disclosure further provides a computer-readable storage medium with instructions stored thereon for performing rough-wavelet based analysis of spatio-temporal patterns. The instructions may include generating a wavelet granulated space of features associated with a multispectral image, selecting features based on a rough set evaluation, removing redundant features, and/or classifying patterns based on selected features, where spectral band values may be used as features.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., adjusting feature selection parameters).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to perform rough-wavelet based analysis of spatio-temporal patterns, the method comprising:
    generating a wavelet granulated space of features associated with a multispectral image, wherein the wavelet granulated space constitutes $4^n$ granules in an n-dimension feature space for a one-level discrete wavelet transform (DWT) decomposition and $7^n$ granules in the n-dimension feature space for a two-level DWT decomposition;
    selecting features based on a rough set evaluation;
    removing redundant features;
    in response to removal of at least one of the redundant features, determining a measure of significance of the features by an evaluation of a change in data dependency of the features, wherein a greater change in data dependency indicates a greater measure of the significance;
    classifying the spatio-temporal patterns based on the selected features; and
    locating and selecting a subset of granulated features based on the significance.

2. The method according to claim 1, further comprising using spectral band values as the features.

3. The method according to claim 1, further comprising:
    generating the wavelet granulated space by formulating shift-invariant granules in wavelet domain; and
    formulating the shift-invariant granules through a shift-invariant discrete wavelet transform (SI-DWT) that characterizes feature values for wavelet granulation of an input pattern vector of the multispectral image.

4. The method according to claim 1, further comprising selecting wavelet bases and decomposition levels to characterize granules for producing wavelet granulation of the n-dimension feature space.

5. The method according to claim 1, wherein selecting the features based on the rough set evaluation comprises employing neighborhood rough sets (NRS) in the selection of the subset of granulated features that further explore at least one from a set of: local and contextual information from neighbor granules.

6. The method according to claim 5, wherein classifying the patterns based on the selected features comprises determining a threshold for distances used in NRS, beyond which classification performance falls, and the method further comprises:
    evaluating the subset of granulated features based on a significance of the features; and
    employing a forward greed search algorithm for the feature selection.

7. The method according to claim 1, further comprising employing one from a set of: a k-nearest neighbors classifier, a maximum likelihood classifier, and a multilayered perceptron classifier to classify the patterns based on the selected features.

8. The method according to claim 7, wherein the k-nearest neighbors classifier uses one from a set of: k=1, k=3, and k=5.

9. An apparatus to perform rough-wavelet based analysis of spatio-temporal patterns, comprising:
    a memory configured to store instructions and data associated with an input pattern vector of a multispectral image;
    a processor coupled to the memory, wherein the processor is adapted to execute the instructions, which when executed configure the processor to:
        generate a wavelet granulated space of features associated with the multispectral image, wherein the wavelet granulated space constitutes $4^n$ granules in an n-dimension feature space for a one-level discrete wavelet transform (DWT) decomposition and $7^n$ granules in the n-dimension feature space for a two-level DWT decomposition;
        select features based on a rough set evaluation;
        remove redundant features; and
        classify the patterns based on the selected features.

10. The apparatus according to claim 9, wherein the rough-wavelet based analysis is performed to generate a model for land cover classification of a multispectral remote sensing image, and wherein the wavelet granulated space is generated by formulating shift-invariant granules in wavelet domain through a shift-invariant DWT (SI-DWT) that characterizes feature values for wavelet granulation of the input pattern vector of the multispectral remote sensing image.

11. The apparatus according to claim 10, wherein the processor is further configured to stop the SI-DWT after a second decomposition.

12. The apparatus according to claim 9, wherein rough-wavelet based analysis is performed for one from a set of: texture detection and image indexing.

13. The apparatus according to claim 9, wherein the processor is further configured to select wavelet bases and decomposition levels to characterize granules to produce wavelet granulation of the n-dimension feature space.

14. The apparatus according to claim 13, wherein the processor is further configured to employ bi-orthogonal wavelet bases.

15. The apparatus according to claim 9, wherein the processor is further configured to employ neighborhood rough sets (NRS) in the selection of a subset of granulated features that further explore at least one from a set of: local and contextual information from neighbor granules, and to evaluate the subset of granulated features based on a significance of the features.

16. A non-transitory computer-readable storage medium having instructions stored thereon to perform rough-wavelet based analysis of spatio-temporal patterns, the instructions comprising:
    generating a wavelet granulated space of features associated with a multispectral image, wherein the wavelet granulated space constitutes $4^n$ granules in an n-dimension feature space for a one-level discrete wavelet transform (DWT) decomposition and $7^n$ granules in the n-dimension feature space for a two-level DWT decomposition;

selecting features based on a rough set evaluation;

removing redundant features; and classifying the patterns based on the selected features.

17. The non-transitory computer-readable storage medium according to claim 16, wherein the instructions further comprise:

generating the wavelet granulated space is by formulating shift-invariant granules in wavelet domain through a shift-invariant DWT (SI-DWT) that characterizes feature values for wavelet granulation of an input pattern vector of the multispectral image; and stopping the SI-DWT after a second decomposition.

18. The non-transitory computer-readable storage medium according to claim 16, wherein the instructions further comprise:

selecting wavelet bases and decomposition levels to characterize granules to produce wavelet granulation of the n-dimension feature space; and employing bi-orthogonal wavelet bases.

19. The non-transitory computer-readable storage medium according to claim 16, wherein selecting the features based on the rough set evaluation comprises employing neighborhood rough sets (NRS) in the selection of a subset of granulated features that further explore at least one from a set of: local and contextual information from neighbor granules and evaluating the subset of granulated features based on a significance of the features.

* * * * *